United States Patent [19]

Glod, Sr. et al.

[11] Patent Number: 5,799,793
[45] Date of Patent: Sep. 1, 1998

[54] EASY-OPEN BAG PACK, METHOD OF FORMING AND SYSTEM

[75] Inventors: Lawrence J. Glod, Sr., Macedon; Richard E. Leone, Newark, both of N.Y.

[73] Assignee: Tenneco Packaging Inc., Mt. Prospect, Ill.

[21] Appl. No.: 938,916

[22] Filed: Sep. 26, 1997

Related U.S. Application Data

[60] Continuation of Ser. No. 477,211, Jun. 7, 1995, abandoned, which is a division of Ser. No. 119,346, Sep. 9, 1993, Pat. No. 5,507,713.

[51] Int. Cl.⁶ .................................................. B65D 33/00
[52] U.S. Cl. .............................. 206/554; 383/8; 383/37
[58] Field of Search .............................. 206/554; 383/6, 383/8, 9, 10, 12, 120, 37

[56] References Cited

U.S. PATENT DOCUMENTS

| | | | |
|---|---|---|---|
| 4,120,716 | 10/1978 | Bonet | 156/272 |
| 4,365,716 | 12/1982 | Watt | 156/272.6 |
| 4,476,979 | 10/1984 | Reimann et al. | 206/554 |
| 4,493,419 | 1/1985 | Prader et al. | 206/554 |
| 4,560,067 | 12/1985 | Reimann | 206/554 |
| 4,562,925 | 1/1986 | Pistner | 206/554 |
| 4,604,084 | 8/1986 | Pistner | 493/226 |
| 4,613,988 | 9/1986 | Maddock | 383/8 |
| 4,652,253 | 3/1987 | Benoit | 493/195 |
| 4,655,737 | 4/1987 | Benoit | 493/194 |
| 4,699,608 | 10/1987 | Pistner | 493/204 |
| 4,744,200 | 5/1988 | Benoit, Jr. et al. | 53/447 |
| 4,785,938 | 11/1988 | Benoit, Jr. et al. | 206/554 |
| 4,790,437 | 12/1988 | Pistner | 206/554 |
| 4,796,759 | 1/1989 | Schisler | 206/554 |
| 4,811,417 | 3/1989 | Prince et al. | 383/9 |
| 4,812,055 | 3/1989 | Prader et al. | 383/119 |
| 4,816,104 | 3/1989 | Benoit | 156/204 |
| 4,819,806 | 4/1989 | Pistner | 206/554 |
| 4,840,610 | 6/1989 | Pistner | 493/194 |
| 4,854,999 | 8/1989 | Schirmer | 156/272 |
| 4,858,862 | 8/1989 | Prader | 248/99 |
| 4,877,473 | 10/1989 | Snowdon et al. | 156/204 |
| 4,883,450 | 11/1989 | Benoit | 493/196 |
| 4,989,732 | 2/1991 | Smith | 206/554 |
| 5,020,750 | 6/1991 | Vrooman et al. | 248/97 |
| 5,087,234 | 2/1992 | Prader et al. | 493/194 |
| 5,183,158 | 2/1993 | Boyd et al. | 206/554 |
| 5,333,730 | 8/1994 | Boyd | 206/554 |
| 5,465,845 | 11/1995 | Norby et al. | 206/554 |
| 5,484,376 | 1/1996 | Prader et al. | 493/194 |

*Primary Examiner*—Jacob K. Ackun
*Attorney, Agent, or Firm*—Arnold, White & Durkee

[57] ABSTRACT

A system for suspending a pack of thermoplastic bags, loading bags, removing loaded bags and for automatically opening the next bag preparatory to loading it by having a pack of handled bags suspended from laterally spaced elongated rods of a rack. The bags have been corona discharge treated to such an extent that the application of pressure will cause adjacently facing regions to releasably adhere together until a moderate force separates them. During removal of a bag front the bag pack at least a portion of the front wall of the next bag will follow the bag being removed for a short distance before separation thereby opening said next bag rendering it ready for loading. An improved means for applying the requisite pressure is disclosed herein.

19 Claims, 3 Drawing Sheets

5,799,793

1

EASY-OPEN BAG PACK, METHOD OF FORMING AND SYSTEM

This application is a continuation of application Ser. No. 08/477,211, filed on Jun. 7, 1995, and now abandoned, which is a division of application Ser. No. 08/119,346, filed on Sep. 9, 1993 now U.S. Pat. No. 5,507,713.

FIELD OF THE INVENTION

The present invention is concerned with a pack of bags of the thermoplastic film type wherein each bag is in the layflat condition. It is also concerned with a method of forming bags and bag packs and a system utilizing the bag packs. More particularly, the present invention relates to a pack of bags wherein each bag is treated, structured and used so that the foremost bag is always in an opened or partially opened condition and, therefore, ready for filing without substantial time lost accessing the bag mouth of each bag.

BACKGROUND OF THE INVENTION

Since the commercial introduction of the plastic film grocery bag in this country, its acceptance has steadily grown because of its many advantages over kraft paper grocery bags. The many advantages connected with present-day plastic grocery bags include their ability to be unaffected by water, the fact that they are not as bulky as paper grocery bags, are less expensive and stronger than paper bags, as well as the fact that most have carrying handles, making them easier to use.

However, because of the inherent lack of rigidity of the plastic film employed in the manufacturing of these bags, special means are required for suspending packs of plastic bags and for holding the foremost bag in a pack in a position conducive to filling the bag. As may be readily appreciated, long lines at the checkout counter of a supermarket are annoying to the customers and baggers. If a bagger utilizing plastic bags has to fumble to open each bag, productivity suffers.

In certain bag dispensing systems wherein the bag pack is used in conjunction with a suspension and dispensing means, the use of plastic bags will outperform paper grocery bags from an ease-of-handling and time standpoint. There is, however, always room for improvement, and any innovation which will cut down handling time and/or in any way facilitate the use of such bags amounts to a significant advance in the art.

Disclosures which relate to improvements in plastic grocery bags and dispensing systems include U.S. Pat. No. 4,165,832 to Kuklies et al., which describes packs of thermoplastic grocery sacks wherein the individual bags are designed to be held in registration by being thermally welded together at a suspension tab member which extends from the center region of the bag mouth. While this type of unitization is effective in maintaining the sacks in secure uniform registration at the bag mouth region, they do not keep the handles in registration. Such a bag pack is structured to be suspended from the center of the pack and it is awkward during dispensing and bag filling to deal with the loose unsecured handles particularly in bag packs containing over 100 bags in the pack.

U.S. Pat. No. 4,676,378, issued to Baxley et al., discloses a technique for suspending a pack of bags from the, handles of the bags in the bag pack. The suspension points are located intermediate the top and the bottom of the handles. This is accomplished by threading each stack of handles onto anchored spaced parallel suspension rods through a suspension orifice in each handle. This means or manner of suspension permits individual bags to be opened with one swipe of the hand, leaving the bag in its opened condition, i.e., front panel separated from the back panel, with the handle loops spread open and suspended from the suspension rods. This broad means will be the suspension means involved in the instant invention.

The Baxley et al. patent also discloses a technique for automatically opening the next bag in a suspended bag pack as a loaded bag is removed from the system. This is essentially the same technique as is disclosed in U.S. Pat. No. 4,106,734, issued to Walitalo, which teaches suspending handle-less bags from suspension rods and utilizing an adhesive area just below the bag mouth on the front of each bag in the pack. This arrangement causes the next adjacent bag in the pack to be in separable adhesive contact with the bag that precedes it. Thus, after a bag is loaded and during removal of the loaded bag from the rack, the front panel of the following bag will tend to follow along a short distance before release. This action causes each following bag to more or less automatically open as a filled bag is removed.

U.S. Pat. No. 4,796,759, issued to Schisler, is directed to a pack of thermoplastic film handled grocery sacks. A hole is present in each handle so as to receive a rod therethrough designed to support the bag pack by the handles. A center support tab extends from the mouth of each bag and the tabs are joined together by welding or gluing to secure the bags in a pack. A line of perforations separate the support tab from the bag mouth. Below the perforation line of each bag is a "glued or welded localized zones 9" which ensures connection between the rear wall of one bag and the front wall of the next bag and so on through the bag pack. Above this point 9, the welded-together support tabs maintain the bags in registration and the localized glued or welded zones 9 assists in opening the bags during the dispensing and loading of the same. This construction also has the disadvantage that no provision is made for maintaining the handles in registration.

While these techniques of enhancing the system of suspending, dispensing and filling grocery sacks have merit, those involving adhesives have the disadvantage of leaving each bag with a more or less localized tacky region on the outside surface of each bag. As may be appreciated, the use of adhesives introduce an additional messy step into the manufacturing process.

Other advances include U.S. Pat. No. 4,811,417, issued to Prince et al., which shows a bag pack having vertical slit support handles therein, wherein the handles are melt-bonded together at the top by means of a heated pin device.

In U.S. Pat. No. 4,989,732, which is incorporated, herein by reference in its entirety for all that it discloses, there is described a system for suspending and dispensing grocery sacks. The bag packs are suspended through orifices in the handles by a pair of spaced parallel cantilevered rods. Dispensing of the bags in a manner which will cause the next following bag to be partially opened upon removal of a lead bag is facilitated by the provision of pressure bonded areas in the handles and in the region of the bag mouth. As a lead bag is removed the next adjacent bag tends to follow along for a short distance during which the front panel of the bag separates from its rear panel. When the lead bag finally releases from the following bag, the next bag is in a partially opened condition so that the supermarket bagger can easily access the interior of the bag.

Application Ser. No. 07/529,806, filed on May 29, 1990, which is a continuation-in-part of application Ser. No.

07/495,070, filed on Mar. 19, 1990, the contents of which are incorporated herein by reference, discloses a thermoplastic film bag pack comprising a plurality of the bags stacked in at least general registration in a layflat condition, each of the bags comprising a bottom, side walls and an open mouth top portion, the open mouth portion comprising handles located at opposite end regions thereof, at least a portion of the external surface of the film of the open mouth and handles region having been subjected to a corona discharge treatment to such an extent that the pressure and cutting action forming the bag mouth and handles will cause adjacently facing corona discharge treated cut-edge regions to releasably adhere together until a moderate force separates them.

Despite these advances in the art, it would be a significant advance if further handling time reductions or improvements which, in any way, facilitate the use of such bags could be accomplished.

SUMMARY OF THE INVENTION

In accordance with the present invention, there is provided a thermoplastic film bag pack comprising a plurality of bags stacked in at least general registration in a layflat condition, each of the bags comprising a bottom wall, a front wall, a rear wall, gusseted side walls and an open mouth top portion, the mouth portion having double film loop handles at opposite ends thereof, the handles being integral extensions of the front, rear and side walls, each of the walls having an interior and exterior surface, wherein at least a portion of each the external surfaces of the front and rear walls are subjected to a corona discharge treatment to an extent effective to cause adjacently facing corona discharge treated surface portions of adjacent bags within the bag pack to releasably fuse to each other upon a localized application of force, the force applied by contacting the bag pack with at least a first pair of anvil means, the pair of anvil means including a lower anvil means positioned to contact the bottom bag of the bag pack within the corona discharge treated surface portion of the bottom bag and an upper anvil means substantially aligned with the lower anvil means and positioned to contact the top bag of the bag pack within the corona discharge treated surface portion of the top bag, the pair of anvil means having a force applied thereto effective to cooperatively form at least one releasable fused region within the corona discharge treated surface portions of each bag of the bag pack.

The present invention is also concerned with a method of forming a pack of gusseted, polyethylene film, integrally-extended handle bags comprising: (a) providing a collapsed tube of polyethylene film; (b) corona discharge treating at least a portion of the external surfaces of the tube; (c) forming side gussets in the tube; (d) transverse-sealing the tube at bag-length distances apart to form a series of end-sealed gusseted pillowcases; (e) separating and stacking a plurality of the pillowcases in at least general registration; and (f) severing all the film layers along a line so as to form integrally extended double film loop handles and an open mouth region in each bag and simultaneously or sequentially forming handle support orifices in each handle; and (g) applying localized pressure to at least one end of the stack by contacting the stack with at least a first pair of anvil means, the pair of anvil means including a lower anvil means positioned to contact the bottom bag of the stack within the corona discharge treated surface portion of the bottom bag and an upper anvil means substantially aligned with the lower anvil means and positioned to contact the top bag of the stack within the corona discharge treated surface portion of the top bag, wherein the pressure applied thereto is effective to cooperatively form at least one releasable fused region within the corona discharge treated surface portions of each bag of the stack.

The invention also relates to a system for suspending a pack of bags, for loading bags, for removing loaded bags and for automatically opening the next bag preparatory to loading comprising; a pack of bags suspended on a rack, the rack comprising a pair of laterally-spaced, elongated support rods having leading ends; the bag pack comprising a plurality of bags stacked in at least general registration in a layflat condition, each of the bags comprising a bottom wall, a front wall, a rear wall, gusseted side walls and an open mouth top portion, the mouth portion having double film loop handles at opposite ends thereof, the handles being integral extensions of the front, rear and side walls, each of the walls having an interior and exterior surface, wherein at least a portion of each the external surfaces of the front and rear walls are subjected to a corona discharge treatment to an extent effective to cause adjacently facing corona discharge treated surface portions of adjacent bags within the bag pack to releasably fuse to each other upon a localized application of force, the force applied by contacting the bag pack with at least a first pair of anvil means, the pair of anvil means including a lower anvil means positioned to contact the bottom bag of the bag pack within the corona discharge treated surface portion of the bottom bag and an upper anvil means substantially aligned with the lower anvil means and positioned to contact the top bag of the bag pack within the corona discharge treated surface portion of the top bag, the pair of anvil means having a force applied thereto effective to cooperatively form at least one releasable fused region within the corona discharge treated surface portions of each bag of the bag pack the fused region releasably adhering until a moderate force causes separation; aligned mounting orifices in association with the handles located between the top and base of the handles; the pack mounted on the support rods through the orifices so that during removal of a bag from the bag pack at least a portion of the mouth and handle region of the front wall of the next bag will follow the bag being removed for a short distance before separation thereby opening the next bag rendering it ready for loading.

Therefore, it is an object of the present invention to provide a pack of thermoplastic film grocery sacks having integrally extended handles with support means in association with the handles.

It is another object of the present invention to provide a system for suspending a pack of bags, for loading bags, for removing loaded bags and for automatically opening the next bag preparatory to loading.

It is a further object of the present invention to provide a method of forming a pack of gusseted, polyethylene film, integrally-extended handle bags.

Other objects and the several advantages of the present invention will become apparent to those skilled in the art upon a reading of the specification and the claims appended thereto.

DETAILED DESCRIPTION OF THE INVENTION

Figure 1:
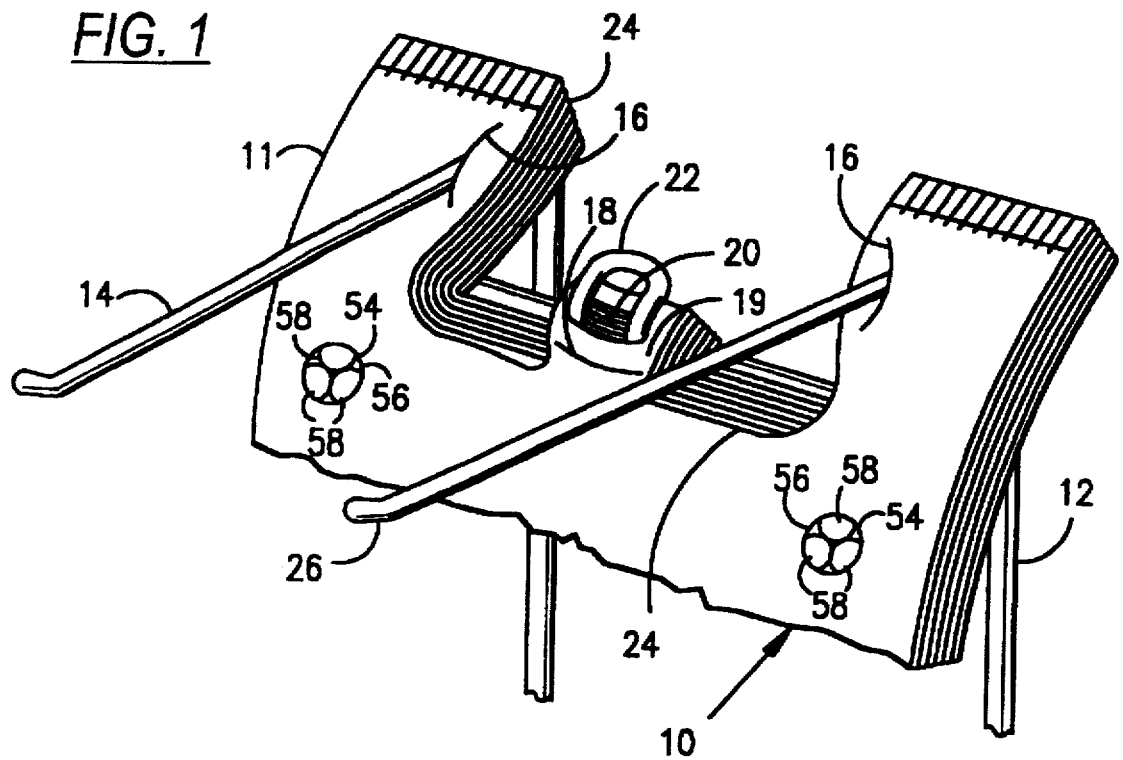
FIG. 1 is a partial perspective view of a bag pack and rack according to the invention.
Figure 2:
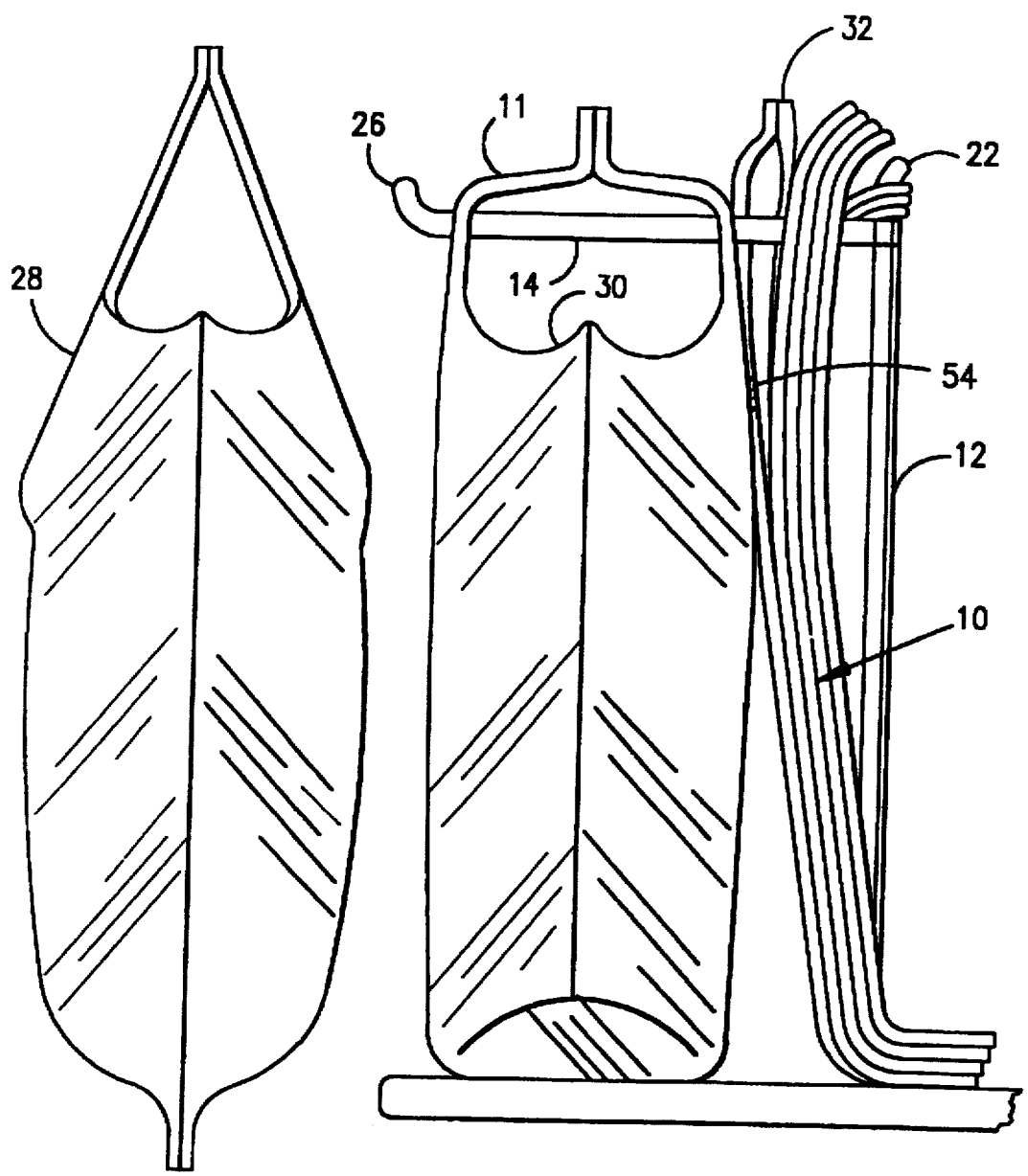
FIG. 2 is a side elevational view of a rack mounted bag pack with several bags shown forwardly drawn therefrom.

In FIG. 1 there is shown a partial segment of a bag pack 10. The lower part of the bag pack is as shown in FIG. 2 and its details are conventional in structure and, thus, form no part of the invention disclosed herein. Pack 10 is shown suspended from rack 12. To accomplish this, the handles 11 are threaded onto parallel arms 14 by way of optionally curved orifices 16.

The individual bags of the bag pack shown have double-film loop handles by virtue of the fact that the bags were made from gusseted pillowcases as is well known in the art. FIG. 2 shows handles 11 of bag 30 almost fully extended on support arms 14. FIG. 1 shows cut line 24, which defines the inboard configuration of the handles, the bag mouth region and a center tab region used for center support of the bag pack. The center tab region includes an orifice 20 utilized for receipt of a suspension member, such as a tongue 22. A separate tab is in association with the front and rear panels of each bag at the mouth region. The front tab has, near the base thereof, a severance line 18 which may be a continuous severance or there may be a small tie connection 19 at each end. In either case, the strength of the material holding the front portion of the bag to the hanger tab area must be small enough to allow the "fusion" of the film layers to cause the attached areas to break on the trailing bag. This severance line permits a supermarket bagger to gain easy access to the front panel of the first bag in a pack preparatory to loading the bag. The rear tab is connected by a perforation line to the back panel of each bag.

The essence of the invention is the provision of a system which permits the automatic opening of a following bag during the removal of a loaded bag. This is accomplished by causing at least some part of the upper regions of the outside surfaces of each bag to lightly adhere to one another in chain-like fashion. The aggressiveness of the adhesion should only be enough to break any front tab connection to the front wall of the following bag and cause the upper portion of the front wall to follow the upper portion of the back wall of the bag being removed, for a short distance, such as that shown in FIG. 2.

Figure 3:
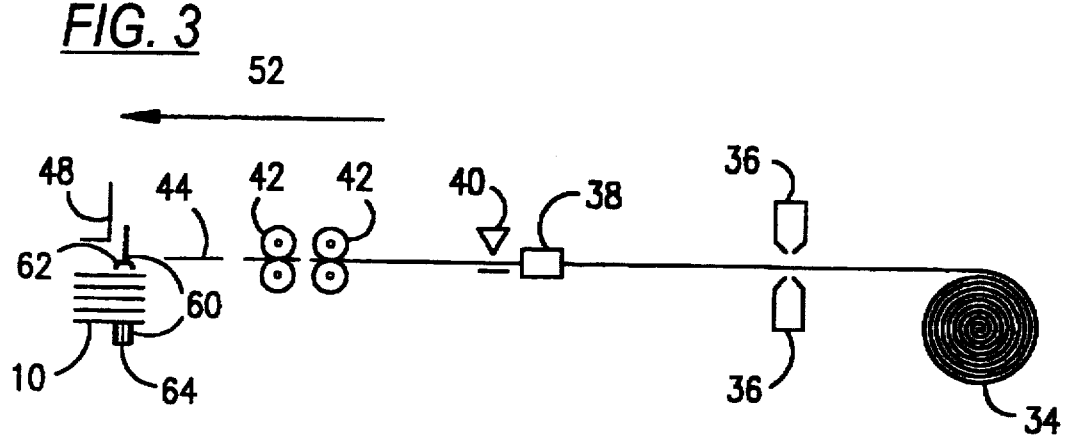
FIG. 3 is a side view of a schematic representation of the method of forming bag packs of the invention.

Referring now to FIG. 3, this phenomenon is accomplished by pretreating the external surfaces of the flattened tubular bag stock polyethylene film material with corona discharge 36 and coupling this with pressure applied by contacting the bag pack 10 with at least a first pair of anvil means 60, the pair of anvil means including a lower anvil means 64 positioned to contact the bottom bag of the bag pack 10 within the corona discharge treated surface portion of the bottom bag and an upper anvil means 62 substantially aligned with lower anvil means 64 and positioned to contact the top bag of the bag pack 10 within the corona discharge treated surface portion of the top bag. As may be appreciated, the pair of anvil means 60 are brought together to contact the bag pack 10 and a force is applied thereto which is effective to cooperatively form a releasable fused region 54 (see FIG. 1) within the corona discharge treated surface portions of each bag of bag pack 10. When the corona discharge treatment region at least involves the upper region of what will become the top front and back of the bag, plus the aforementioned application of force, the automatic bag opening will result during use of the packs according to the present system.

The strength of the adhesion of the releasably fused regions is comparatively small. Yet, small as it is, it is strong enough to break any properly designed tab ties 19 located at the ends of severance line 18. For example, with about 0.45–0.75 mil films, tab ties of up to 3/16 inch are easily broken. Thus, the force necessary to break the adhesion is also comparatively small. This force is supplied by the drag caused by the full weight of the entire following bag, by the drag of the handle film material against the support rod material and/or by the resistance caused by the turned-up ends 26 of the support rods 14. As shown in FIG. 2, bag 28 has separated from bag 30 by reason of one or all of these causes and bag 32 remains adhered to bag 30 but is in the early stage of opening.

FIG. 3 illustrates schematically the formation of the treated bag packs. A convoluted roll 34 of a flattened tubular film is the precursor for the individual bags. This film material can be any thermoplastic material which can be treated with corona discharge to so as to be utilizable in the system of the present invention. A suitable class of materials are the polyethylenes generically, including homopolymer polyethylene of high, intermediate or low density, linear low density copolymers of ethylene and another $C_3$–$C_{10}$ alpha-olefin (LLDPE), and any blends of the foregoing. The thickness of the film is that normally used for grocery bags and may range from about 0.3 to about 1.5 mils or greater. A preferred thickness is from about 0.45 to about 0.75 mils. Any size bag is contemplated but the 1/6 bbl. bag and smaller is preferred.

The film material is passed in the direction of arrow 52 between two oppositely disposed corona discharge treaters 36 positioned so as to treat the outside surfaces of the collapsed tube. The treatment can be intermittent so as to treat a designated region or regions of the film or it may be a continuous treatment affecting all of the outside of the bag or that of a narrower stripe restricted to, e.g., the upper-center region of the bag. Corona discharge treatment equipment is readily available commercially. Appropriate equipment can be obtained from Solo Systems Inc., Garland, Tex.; Corotec Corp., Collinsville, Conn.; and others. The film should be treated to a surface tension level of at least about 38 dynes/cm, in accordance with ASTM Standard D2578-84. A range of between about 40 to about 55 is preferred. Using Solo Systems equipment, each treater can have an air gap of 0.060 inch when treating LLDPE film of about 0.65 mils. The treatment area can include a center region of the film about 11 inches wide, treated to 40–44 dynes/cm, as is particularly preferred.

After this degree of treatment, the tube is passer through a gusseter 38 which includes a gusset of from about 3 to about 5 inches into the collapsed tube. The tube proceeds to a transverse heat seal means 40 of conventional design which imposes heat seals 50 at bag length distances apart. Such a heat seal means is usually a resistance strip or bar, positioned to put a transverse seal across the gusseted tube at bag length distances apart. The sealed tube then proceeds to a combination of differential speed rollers which separates the tube into end-sealed gusseted pillowcases 44. The pillowcases are then stacked to the appropriate number desired, e.g., 75, 100, 125, etc., and, either in line or at a remote location, a cutting device 48 applies pressure and cuts one end of the stack so as to remove plastic, leaving the shape of handles, a bag mouth and center suspension tabs in the bag pack. This cutting device 48 may also include means for including a suspension orifice in the handles of the bags. The orifice can be of a variety of shapes, e.g., a circle, part of a circle with a flap remaining therein, a curve of less than one-quarter of a circle, a straight slit, a teardrop cutout, a zig-zag orifice, etc. As shown in FIG. 1, handle suspension orifice 16 is a curved slit facing inward of the handles so that any tendency to tear will propagate toward the inner edge of the handles rather than to the center thereof where it would weaken the handles.

Also, either in line or at a remote location, to releasably fuse the treated surfaces of adjacent bags to each other, a localized force is applied. As indicated above, the force is applied by contacting bag pack 10 with at least a first pair of anvil means 60, the pair of anvil means 60 including a lower anvil means 64, positioned to contact the bottom bag of the bag pack 10 within the corona discharge treated surface portion of the bottom bag and an upper anvil means 62 substantially aligned with the lower anvil means 64 and positioned to contact the top bag of the bag pack within the corona discharge treated surface portion of the top bag. Following bringing the anvil means in close contact with each other, the bag pack 10 being in between the upper and lower anvil means 62 and 64, the pair of anvil means 60 then have a force applied which is effective to cooperatively form at least one releasable fused region 54 within the corona discharge treated surface portions of each bag of the bag pack 10.

Figure 5:
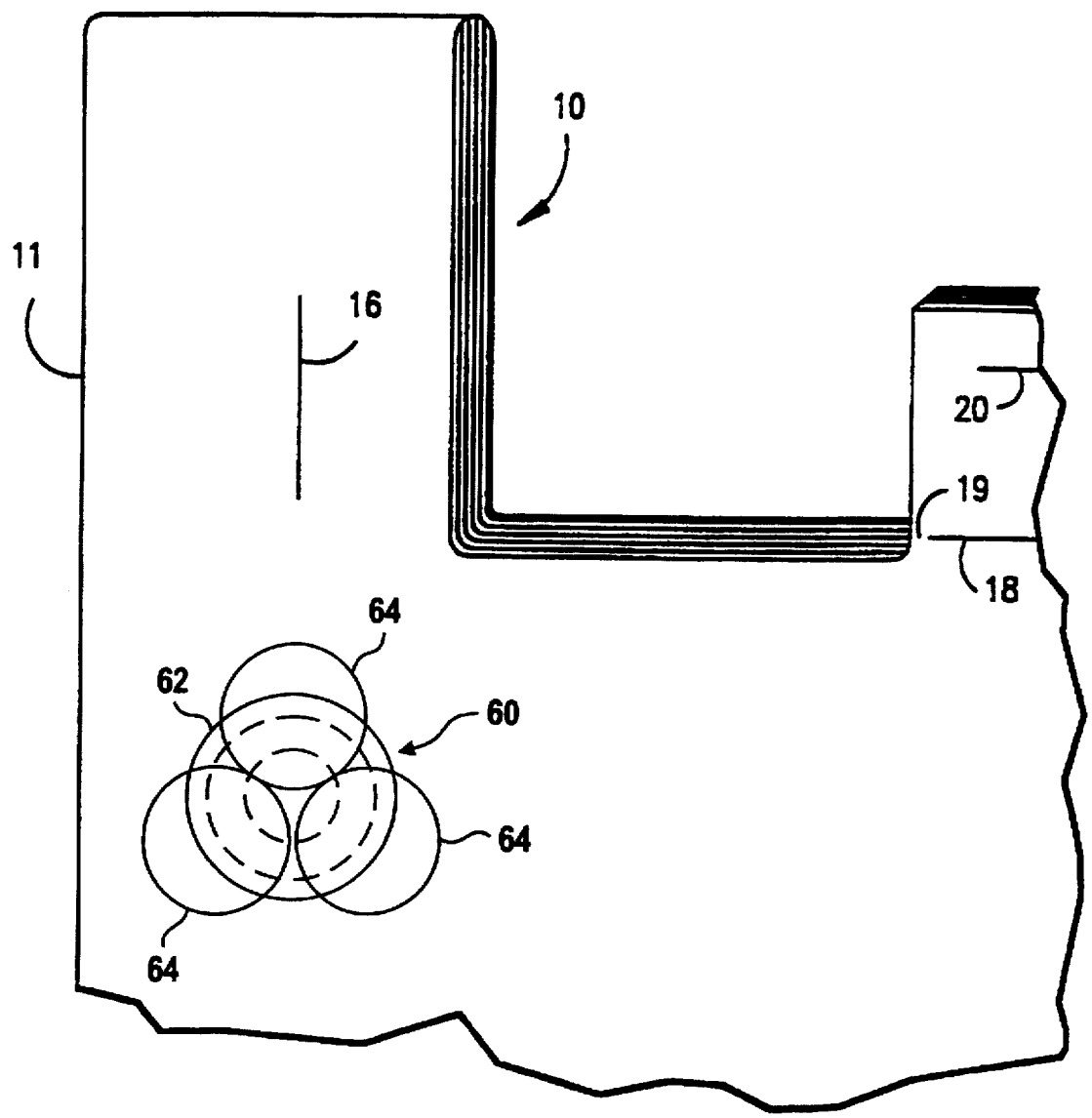
FIG. 5 is a partial top view of a bag pack which is to be contacted by upper and lower anvil means, schematically represented.

Referring to also to FIG. 5, in which a partial view top view of bag pack 10 is shown about to be contacted by upper and lower anvil means 62 and 64 (schematically represented), as is preferred, lower anvil means 64 comprises a plurality of anvils having substantially convex surfaces, the plurality of anvils being tangentially aligned. As shown and particularly preferred, the lower anvil means 64 includes at least three convex-surfaced anvils triangularly aligned.

Referring once again to FIG. 3, as well as to FIG. 5, upper anvil means 62 includes a concave-surfaced anvil having a cross-sectional diameter capable of substantially encompassing lower anvil means 64.

Referring again to FIG. 1, to form the particularly preferred bag pack 10, depicted therein, the use of a first and second pair of anvil means 60 is required to form first and second releasable fused regions 54 within the corona discharge treated surface portions of each bag of bag pack 10. Although from an operational standpoint, the exact location of first and second releasable fused regions 54 can be varied, it is preferred that the first and second releasable fused regions 54 be located below each handle 11 of each bag.

As shown in FIG. 1 and, as may be appreciated by reference to FIG. 5, the force applied will result in the formation of hyperbolic paraboloid shaped dimples 58 in bag pack 10. As is particularly preferred, the dimple placement is below the mouth 24 and handle 11 region of the bags. Referring again to FIG. 2, the resulting fusion dimples 58, preferably placed equidistant to each other, create forces to either open a sack partially, or provide a full opening when the preceding sack 28 is removed from the dispensing rack 12. This feature provides easy accessibility to the empty sack 30 for loading purposes.

The preferred fusion mechanism is created by utilizing corona treatment on the outside film surfaces, described above, coupled with ultrasonic bonding, which transforms high frequency electrical energy into mechanical energy at, for example, 20 KHZ per second. In the preferred system for use in achieving this fusion bonding, a resonating converter is mounted on the end of an air cylinder and is coupled to upper anvil means 62. As is particularly preferred, upper anvil means 62 can be a circular anvil-shaped horn for transmitting the energy. An anvil-shaped horn made of titanium and 0.800 inches in diameter has been found to be very effective in this application. In operation, the air cylinder initially pushes the upper anvil means 62 into contact with the bag stack 10. Once contact is achieved a burst of mechanical vibrating energy is transmitted from the upper anvil means 62 through the bag stack 10, exciting the treated film surfaces, creating frictional heat, causing a softening of the plastic film just below the melting point. Boost air pressure is then applied instantaneously to the air cylinder to pressure form the circular upper anvil means 62 through the bag stack 10, compressing the bag stack 10 onto the three smaller circular anvils 64 placed in a tangential triangular shape, to form the fusion dimples 56 having an outline 56. Lower anvil means 64 having three 0.500 inch circular anvils have been found to be very effective in this application.

A unique advantage of utilizing ultrasonic bonding is that the thermoplastic film does not degrade from the operation. As soon as the ultrasonic exposure is terminated, the material solidifies. Additionally, the fusion dimples 54 do not impose weak points in the film, as is often the case with other bonding techniques.

It will be noted that the suspension orifices are located at a midway position in the handles. This is important for the most efficient operation of the system of the present invention. Located midway permits the loop of the handles to spread open on suspension rods 14 as shown in FIG. 2. Spreading the handle loops in this manner opens the bag. If the bags were suspended from the handles from a point above the top seals of the handles, as taught by some prior art, the handle loops would not be able to spread open because the support rods would be remote from the loops. As indicated above, seconds and fractions of a second are extremely important when translated into the front end overhead costs of a supermarket. Any improvement which saves these short intervals of overhead expense is a significant advance in the art. The overall time saved by the present invention is considerable.

Figure 4:
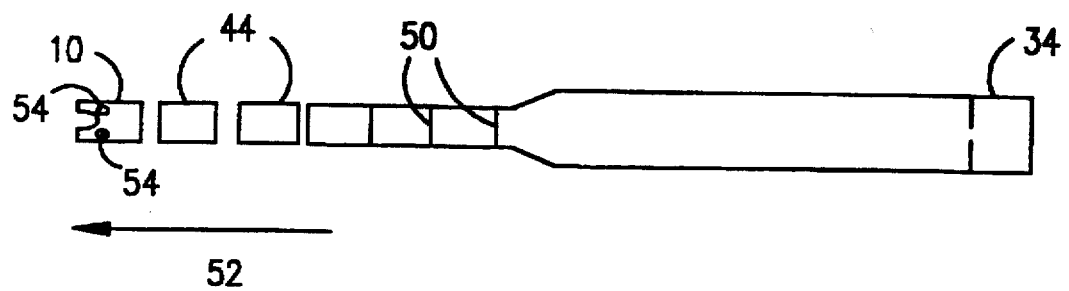
FIG. 4 is a plan view of the schematic of FIG. 3 absent the manipulative means.

FIG. 4 shows in plan view the operation and results of carrying out the process of FIG. 3 which culminates in the formation of bag pack 10. As may be seen, releasably fused regions 54 have been formed in the bags of bag pack 10.

It is not fully understood why the corona discharge treatment and pressure technique results in the efficient automatic opening of a following bag in the subject system. Attention is, however, directed to the paper MECHANISM OF CORONA-INDUCED SELF-ADHESION OF POLYETHYLENE FILM by D. K. Owens, Journal of Applied Polymer Science Vol. 19, pp. 265–271 (1975). In this paper it is postulated that the force of adhesion between corona-treated polyethylene films is a hydrogen bond between the hydrogens of enolized keto groups in one sheet of film and carbonyl groups in the other. The corona treatment across the front and back of each gusseted sack is believed to stimulate both the bonding and releasing effect created by the dimple design.

Although the present invention has been described with preferred embodiments, it is to be understood that variations and modifications may be resorted to, without departing from the spirit and scope of the invention, as those skilled in the art will understand. Such modifications and variations are considered to be within the purview and scope of the appended claims.

What is claimed is:

1. A thermoplastic film bag pack comprising a plurality of bags stacked in at least general registration in a layflat condition, each of said bags comprising a bottom wall, a front wall, a rear wall, gusseted side walls and an open mouth top portion, said open mouth top portion having double film loop handles at opposite ends thereof, said handles being integral extensions of said front, rear and side walls, each of said walls having an interior and exterior surface, > each of said bags having been subjected to a corona discharge treatment on the exterior surface of said front and rear walls so as to define treated surface portions of each bag, the treated surface portions of each adjacently facing bag in the bag pack being releasably fused to each other in at least one releasable fused region, said at least one releasable fused region having been commonly formed in each of said adjacently facing bags in response to cooperative application of force to said bag pack by a corresponding at least one pair of anvil means, the pair of anvil means including a lower anvil means positioned to contact the bottom bag of the bag pack within the treated surface portion of the bottom bag and an upper anvil means substantially aligned with the lower anvil means and positioned to contact the top bag of the bag pack within the treated surface portion of the top bag, and
>
> wherein the cooperative application of force by said upper and lower anvil means is effective to compress the treated surface portions of each bag between said upper and lower anvil means and define a shape of the releasable fused region, said shape including a plurality of at least two dimples formed by said lower anvil means.

2. The bag pack of claim 1, wherein said lower anvil means comprises a plurality of lower anvils each having substantially convex endface surfaces, said endface surfaces having substantially circular cross-sections for forming said plurality of dimples defining the shape of the releasable fused region, said plurality of dimples each having a substantially circular cross-section corresponding to the endface surfaces of said plurality of lower anvils.

3. The bag pack of claim 2, wherein said plurality of lower anvils comprises three anvils triangularly aligned so as to form said plurality of dimples in a corresponding triangular shape.

4. The bag pack of claim 3, wherein said upper anvil means comprises an upper anvil having a substantially concave endface surface, the endface surface of said upper anvil means having a substantially circular cross-section substantially encompassing said lower anvil means and defining an outer boundary of said plurality of dimples in response to the cooperative application of force by said upper and lower anvil means.

5. The bag pack of claim 2, wherein said upper anvil means comprises an upper anvil having a substantially concave endface surface, the endface surface of said upper anvil means having a substantially circular cross-section substantially encompassing said lower anvil means and defining an outer boundary of said plurality of dimples in response to the cooperative application of force by said upper and lower anvil means.

6. The bag pack of claim 4, wherein said force applied includes an ultrasonically applied force.

7. The bag pack of claim 1, wherein said force applied includes an ultrasonically applied force.

8. The bag pack of claim 6, wherein the treated surface portions of each adjacently facing bag in the bag pack are releasably fused to each other in at least two releasable fused regions, said at least two releasable fused regions each having been commonly formed in each of said adjacently facing bags in response to cooperative application of force to said bag pack by respective first and second pairs of anvil means, each of said first and second pair of anvil means including a lower anvil means positioned to contact the bottom bag of the bag pack within the treated surface portion of the bottom bag and an upper anvil means substantially aligned with the lower anvil means and positioned to contact the top bag of the bag pack within the treated surface portion of the top bag.

9. The bag pack of claim 8, wherein said first and second releasable fused regions are located below each handle of each bag.

10. The bag pack of claim 9, wherein said corona discharge treatment is conducted to achieve a surface tension of at least about 38 dynes/cm.

11. A system for suspending a pack of bags, for loading bags, for removing loaded bags and for automatically opening the next bag preparatory to loading it, comprising:

> a pack of bags suspended on a rack, said rack comprising a pair of laterally-spaced, elongated support rods having leading ends;
>
> said bag pack comprising a plurality of bags stacked in at least general registration in a layflat condition, each of said plurality of bags comprising a bottom walls, a front wall, a rear wall, gusseted side walls and an open mouth top portion, said open mouth top portion having double film loop handles at opposite ends thereof, said handles being integral extensions of said front, rear and side walls, each of said walls having an interior and exterior surface,
>
> each of said bags having been subjected to a corona discharge treatment on the exterior surface of said front and rear walls so as to define treated surface portions of each bag, the treated surface portions of each adjacently facing bag in the bag pack being releasably fused to each other in at least one releasable fused region, said at least one releasable fused region having been commonly formed in each of said adjacently facing bags in response to cooperative application of force to said bag pack by a corresponding at least one pair of anvil means, the pair of anvil means including a lower anvil means positioned to contact the bottom bag of the bag pack within the treated surface portion of the bottom bag and an upper anvil means substantially aligned with the lower anvil means and positioned to contact the top bag of the bag pack within the treated surface portion of the top bag, the cooperative application of force by said upper and lower anvil means being effective to compress the treated surface portions of each bag between said upper and lower anvil means and define a shape of the releasable fused region, said shape including a plurality of at least two dimples formed by said lower anvil means;
>
> aligned mounting orifices in association with said handles located between the top and base of said handles;
>
> said pack mounted on said support rods through said orifices so that during removal of a bag from the bag pack at least a section of the mouth and handle region of the front wall of the next bag will follow the bag being removed for a short distance before separation thereby opening said next bag rendering it ready for loading.

12. A thermoplastic film bag pack comprising a plurality of bags stacked in at least general registration in a layflat condition, each of said bags comprising a bottom wall, a front wall, a rear wall, gusseted side walls and an open mouth top portion, said open mouth top portion having double film loop handles at opposite ends thereof, said handles being integral extensions of said front, rear and side walls, each of said walls having an interior and exterior surface;

each of said bags having been subjected to a corona discharge treatment on the exterior surface of said front and rear walls so as to define treated surface portions of each bag, the treated surface portions of each adjacently facing bag in the bag pack being releasably fused to each other in at least one releasable fused region, said at least one releasable fused region having been commonly formed in each of said adjacently facing bags in response to cooperative application of force to said bag pack by a corresponding at least one pair of anvil means, the pair of anvil means including a lower anvil means positioned to contact the bottom bag of the bag pack within the treated surface portion of the bottom bag and an upper anvil means substantially aligned with the lower anvil means and positioned to contact the top bag of the bag pack within the treated surface portion of the top bag;

wherein the lower anvil means comprises a plurality of lower anvils each having substantially convex endface surfaces, said endface surfaces having substantially circular cross-sections;

wherein said upper anvil means comprises an upper anvil having a substantially concave endface surface, the endface surface of said upper anvil means having a substantially circular cross-section substantially encompassing said lower anvil means; and wherein the cooperative application of force by said upper and lower anvil means is effective to compress the treated surface portions of each bag between said upper and lower anvil means and define a shape of the releasable fused region, said shape including a plurality of at least two dimples each having substantially circular cross sections formed by said lower anvil means.

13. The bag pack of claim 12, wherein said lower anvil means comprises a plurality of lower anvils each having substantially convex endface surfaces, said endface surfaces having substantially circular cross-sections for forming said plurality of dimples defining the shape of the releasable fused region, said plurality of dimples each having a substantially circular cross-section corresponding to the endface surfaces of said plurality of lower anvils.

14. The bag pack of claim 13, wherein said plurality of lower anvils comprises three anvils triangularly aligned so as to form said plurality of dimples in a corresponding triangular shape.

15. The bag pack of claim 14, wherein said upper anvil means comprises an upper anvil having a substantially concave endface surface, the endface surface of said upper anvil means having a substantially circular cross-section substantially encompassing said lower anvil means and defining an outer boundary of said plurality of dimples in response to the cooperative application of force by said upper and lower anvil means.

16. The bag pack of claim 13, wherein said upper anvil means comprises an upper anvil having a substantially concave endface surface, the endface surface of said upper anvil means having a substantially circular cross-section substantially encompassing said lower anvil means and defining an outer boundary of said plurality of dimples in response to the cooperative application of force by said upper and lower anvil means.

17. The bag pack of claim 12, wherein said force applied includes an ultrasonically applied force.

18. The bag pack of claim 17, wherein the treated surface portions of each adjacently facing bag in the bag pack are releasably fused to each other in at least two releasable fused regions, said at least two releasable fused regions each having been commonly formed in each of said adjacently facing bags in response to cooperative application of force to said bag pack by respective first and second pairs of anvil means, each of said first and second pair of anvil means including a lower anvil means positioned to contact the bottom bag of the bag pack within the treated surface portion of the bottom bag and an upper anvil means substantially aligned with the lower anvil means and positioned to contact the top bag of the bag pack within the treated surface portion of the top bag.

19. The bag pack of claim 18, wherein said first and second regions are located below each handle of each bag.

\* \* \* \* \*